Aug. 29, 1961 W. H. DRUMMOND ET AL 2,998,465
QUENCH SYSTEM
Filed Oct. 9, 1957 3 Sheets-Sheet 1
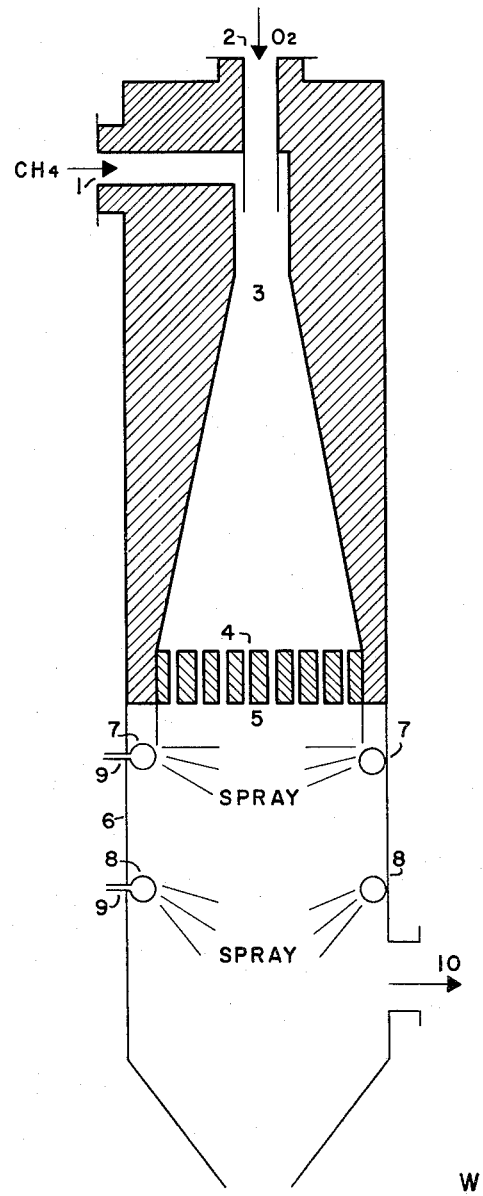
WILLIAM H. DRUMMOND
ALFRED E. WITHROW
INVENTORS
ATTORNEY Aug. 29, 1961  W. H. DRUMMOND ET AL  2,998,465
QUENCH SYSTEM
Filed Oct. 9, 1957  3 Sheets-Sheet 2
FIGURE II
PRIOR ART
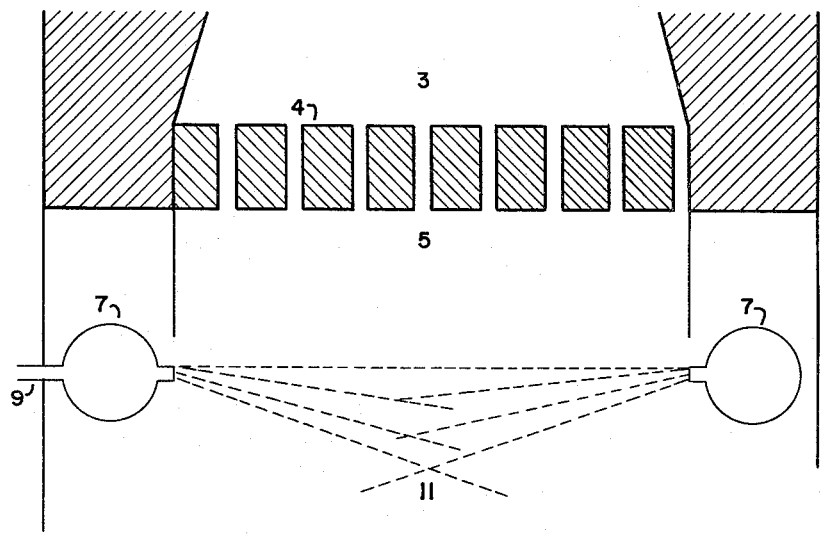
FIGURE III
THIS INVENTION
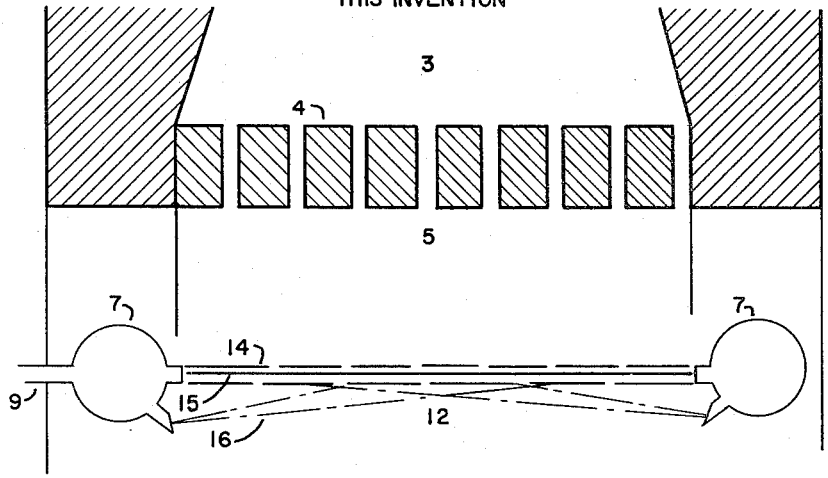
WILLIAM H. DRUMMOND
ALFRED E. WITHROW
*INVENTORS*
BY
*ATTORNEY*

Aug. 29, 1961  W. H. DRUMMOND ET AL  2,998,465
QUENCH SYSTEM
Filed Oct. 9, 1957  3 Sheets-Sheet 3
FIGURE IV
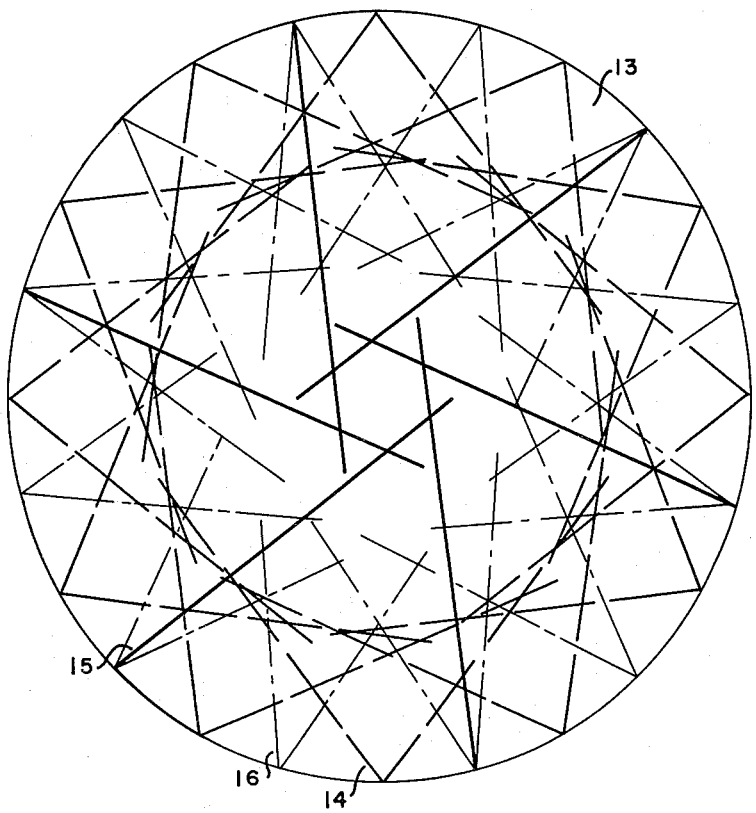
LEGEND:
VEEJET ——14——
FLATJET ——16——
SOLID JET ——15——
WILLIAM H. DRUMMOND
ALFRED E. WITHROW
*INVENTORS*
BY
*ATTORNEY*

2,998,465
QUENCH SYSTEM
William H. Drummond, Texas City, and Alfred E. Withrow, Dickinson, Tex., assignors to Monsanto Chemical Company, St. Louis, Mo., a corporation of Delaware
Filed Oct. 9, 1957, Ser. No. 689,091
12 Claims. (Cl. 260—679)

This invention pertains to chemical reactions carried out in the vapor phase at elevated temperatures and more particularly to the stopping of such reactions by quenching the reaction mixture with a liquid quenching medium to reduce the temperature of the reacting mixture to a temperature below the reaction temperature.

Many chemical reactions are carried out in a turbulent vapor phase at significantly elevated temperatures and frequently are accompanied with the actual formation of a flame during the reaction. In many such reactions, the reaction is stopped by bringing the reaction mixture into contact with a liquid coooling quenching medium, usually in the form of sprays, which suddenly lowers the temperature of the reacting mixture to a point below the minimum temperature at which the reaction or undesirable side reactions can proceed. Typical reactions of this type are the partial oxidation of hydrocarbons to produce carbon black, synthesis gas or hydrocarbons of a greater degree of unsaturation than the hydrocarbons oxidized. In the production of acetylene, for example, methane or other suitable hydrocarbons and oxygen are preheated, mixed and then ignited in a flame room. The reaction is stopped by quenching the flame by means of a series of water sprays situated circumferentially around the exit of the flame room. The water sprays quench the reacting mixture to a point below reaction temperature and acetylene is then recovered from the cooled cracked gases.

The size of the reactor and gas flow in such reactions is designed and adjusted to provide a proper residence time. It has generally been recognized that adequate quenching requires that the quench fluid reach the center of the reaction mixture in order that the reaction be stopped throughout the entire mixture. Spray designs and quench patterns heretofore used have not provided adequate quenching across the entire quench zone, particularly at the center. Efficient quenching technique requires the quench pattern be such that substantially uniform quenching is obtained across the cross section of the reacting mixture in a plane perpendicular to the direction of flow of the reacting mixture through the quench zone.

It is an object of this invention to provide an improved proceess for the quenching of the reacting mixtures.

It is another object of this invention to provide an improved process for the quenching of flame reactions.

A particular object of this invention is to provide an improved process for quenching the reaction mixture obtained in the partial oxidation of hydrocarbons.

A still further object of this invention is to provide an improvement in the process for the production of acetylene by the partial oxidation of methane.

Other objects will become apparent from the description of the invention.

These objectives are obtained according to this invention by quenching the reaction mixture obtained in a chemical reaction carried out in the vapor phase at elevated temperatures in a quench zone to reduce the temperature of the reaction mixture by passing the reaction mixture through a cooling liquid quench spray formed by the confluence of at least two sets of cooling liquid sprays so positioned and directed with respect to each other that, at the point of entry of the reaction mixture into the quench zone, the resulting quench spray presents a layer of cooling liquid perpendicular to the direction of flow of the reaction mixture and substantially covering the quench zone and contains a greater quantity of cooling liquid in the central area of the quench zone than at the periphery. This is readily accomplished by using two sets of sprays and positioning one set of sprays slightly downstream from the other in the quench zone. The first set of sprays, that is the set located nearest the point of entry of the reaction mixture into the quench zone, being directed to form, at the point of entry of the reaction mixture into the quench spray, a layer of cooling liquid which is perpendicular to the direction of flow of the reaction mixture and substantially covers the cross sectional area of the quench zone. The second set of sprays is positioned slightly downstream from the first and is directed to form a spray merging with the central area of the spray produced by the first set of sprays.

The process of this invention is illustrated in the following examples. For purposes of illustration only, the process is described in detail in connection with the partial oxidation of methane to produce acetylene. FIGURE I is a schematic sectional drawing of a conventional acetylene burner with its associated quenching zone on which the data set forth in the examples were obtained. FIGURE II is a schematic sectional drawing of just the flame room and the first quench ring of FIGURE I enlarged to illustrate the vertical quench spray pattern obtained using nozzles as described in Example I. FIGURE III is schematic sectional drawing of just the flame room and the first quench ring of FIGURE I enlarged to illustrate the vertical quench spray pattern obtained using nozzles as described in Example II. FIGURE IV is a schematic drawing of the horizontal spray pattern produced by the quench system described in Example II. The contents of these figures are explained in greater detail in the examples.

*Example I*

The acetylene burner comprised a methane inlet 1 and an oxygen inlet 2. Methane and oxygen were preheated before introduction into the elongated mixing chamber 3. The mixed gases passed through the cylindrical channels in the burner block 4 into the flame room 5. In the flame room the gas was ignited and passed to quench zone 6 equipped with quench rings 7 and 8. Quench rings 7 and 8 were rings fitted with various types of nozzles which will be described in more detail. Each quench ring was equipped with a water inlet 9. Cooled cracked gases were withdrawn through outlet 10 and acetylene recovered therefrom by conventional techniques. Due to the short residence time in the flame room required for the production of acetylene, only quench ring 7 is vitally associated with the process of this example insofar as this invention is concerned.

The flame room of the burner is in the shape of a regular hexagon. The quench ring 7 was first equipped with 44 hollow cone spray nozzles. These nozzles were designated as Model No. 1337–F, manufactured by the Spray Engineering Company. The angle of the hollow cone of water produced by this nozzle is 60°. The nozzle delivers 1.72 g.p.m. water at 75 p.s.i.g. The nozzles were affixed to quench ring 7 at 2½″ intervals around the ring. The center of the cone was directed 30° down from the horizontal and 12° off center. The upper-most part of the spray cone entered the quench zone ¾″ below the flame room. The tangent of the upper-most surface of the spray cone was essentially horizontal and perpendicular to the direction of flow of the reaction mixture. Water fed to the quench ring at approximately 75 g.p.m. at 75 p.s.i.g. and a temperature of 80° C. The vertical spray pattern 11 produced by this quench ring is shown in FIGURE II.

The cold quench ring 8 was positioned approximately

11″ below the hot quench ring 7 and was equipped with 64 hollow cone nozzles of the type designated as Model No. 1148–F by Spray Engineering Company. The nozzles produced a 90° hollow cone of water and were positioned at a 45° angle down from the horizontal and 12° off center.

Methane was preheated to a temperature of 600° C. and fed to the burner at the rate of 3500 pounds per hour. Oxygen was preheated to 600° C. and fed to the burner at 4025 pounds per hour.

The cracked gas contained 8.00% acetylene at the cracked gas exit. The quench system described in this Example I does not provide uniform quenching across the quench zone on a plane perpendicular to the direction of flow of gases through the quench zone.

Example II

The procedure set forth in Example I was repeated except that quench ring 7 was equipped with twelve Veejet-type sprays spaced at 30° intervals around the ring which were alternately spaced with 12 Flatjet sprays located at 30° intervals and six solid jet sprays at 60° intervals. The Veejet sprays were Model No. 1/4 USS6540 manufactured by Spraying Systems Company. The Veejet spray produces a spray of water which fans out at an angle of approximately 72°. The nozzle delivers 2.4 g.p.m. of water at 60 p.s.i.g. The Flatjet sprays were Model No. 1/4 PSS3520 manufactured by the same company. These produce a spray of water which fans out at an angle of approximately 35°. The nozzle delivers 4.9 g.p.m. of $H_2O$ at 60 p.s.i.g. The solid jet spray Model No. 1/4 USS040 produces a stream of water 0.1″ in diameter and delivers about 4.9 g.p.m. $H_2O$ at 60 p.s.i.g. The solid jets entered the quench zone without any downward deflection. The Veejets were substantially horizontal and entered the quench zone approximately 1″ below the edge of the flame room. The Flatjets entered the quench zone approximately 1¼″ below the edge of the flame room and were positioned so that their spray merged with the sprays from the Veejet and solid jets in the central area of the quench zone. The vertical quench pattern 12 produced by this quench ring is shown in FIGURE III and the horizontal quench pattern 13 produced by this quench ring is shown in FIGURE IV. It is seen that the combination of Veejets 14 and solid jets 15 produce a layer of water which is perpendicular to the direction of flow of the reaction mixture and substantially covers the quench zone at the point of entry of the reaction mixture into the zone. The Flatjets 16 are positioned slightly downstream and their spray merged with the spray of the Veejets and solid jets in the central area of the quench zone at the point of entry of the reaction mixture into the zone. Water was fed to the quench ring at approximately 90 g.p.m. at 66 p.s.i.g. and a temperature of 80° C.

Quench ring 8 was constructed as in Example I. Reaction conditions in this example were essentially the same as in Example I. Preheat temperature was 600° C. Methane was fed at the rate of 3500 pounds per hour and oxygen was fed at the rate of 3900 pounds per hour. In this case, quenching was substantially uniform across the quench zone and the cracked gas contained 8.41% acetylene at the cracked gas exit.

Comparison of Examples I and II clearly indicates the highly improved results obtained in accordance with the practice of this invention.

In both examples all acetylene contents are expressed as mol percent of the total cracked gas mixture on a dry, soot free, basis.

It is obvious to those skilled in the art that the novel process of this invention can be varied substantially and is applicable to many processes. The examples illustrated the multiple sets of sprays being fixed to the same quench ring even though one set is located slightly downstream of the other. Similar results are obtained when the individual sets of sprays are attached to separate quench rings with one quench ring then being located downstream of the other. The distance between the two sets of sprays is necessarily variable and will be dictated to a large extent by the type of individual sprays used.

Example II illustrated the use of a combination of solid jet sprays and flat V-shaped sprays to produce the layer of cooling liquid which, at the point of entry into the reaction mixture into the quench zone, is perpendicular to the direction of flow of the reaction mixture and substantially covers the cross sectional area of the quench zone. While this constitutes a preferred combination for the top quench spray other types of individual sprays can be used to make up the top spray. Thus, this top spray can be formed by the use of flat V-shaped sprays alone, hollow cone sprays, hollow cone sprays combined with solid jets, and so forth. Example II illustrated the use of smaller V-shaped sprays to form the second set of sprays which is positioned downstream of the first set of sprays and directed toward the central area of the layer of cooling liquid produced by the first set of sprays. This second set of sprays can be formed by individual sprays other than those shown on Example II. Thus, this second set of sprays can be formed by individual hollow cone sprays, solid jet sprays, V-shaped sprays of different size than those shown in Example II and so forth. In its broadest aspect, the invention herein is based upon the combined use of multiple sets of sprays, directed to merge with each other so as to produce a layer of cooling liquid which is perpendicular to the direction of flow of the reaction mixture to be quenched, substantially covers the cross sectional area of the quench zone at the point of entry and contains more cooling liquid in the central area of the quench zone at the point of entry than at the periphery of the quench zone. While certain types of individual sprays facilitate the practice of this invention and constitute preferred embodiments thereof, the broad aspect of this invention can be practiced regardless of the types of individual sprays used to form the sets of sprays.

Example II illustrates the use of two sets of sprays in the practice of this invention. More than two sets of sprays can also be used. Thus, quenching can be effected in accordance with this invention using the two sets of sprays described in Example II together with a third set of sprays positioned still further downstream and directed so that its spray merges with the spray produced by the first set of sprays in the central area of the quench zone so as to produce an even greater quantity of cooling liquid in the layer of water at the point of entry of the reaction mixture into the quench zone.

In order to obtain a uniform pattern of quenching liquid across a quench zone, individual spray nozzles are customarily positioned, usually symmetrically positioned, around the periphery of the quench zone on a plane which is substantially perpendicular to the flow of the reaction mixture through the quench zone. Such a grouping of individual spray nozzles or sprays, constitutes what is meant herein by a set of cooling liquid sprays.

While the examples have illustrated the application of the process of this invention to the production of acetylene, it is apparent that the process is not limited thereto. It is applicable to any process which is carried out in the vapor phase at elevated temperatures and which requires a rapid reduction in the temperature of the reacting mixture in order to stop the reaction at the desired point. While it is particularly applicable in the quenching of flame reactions it is not necessary that the reaction be accompanied with the production of a flame under reaction conditions in order for the process of this invention be used. The partial oxidation of hydrocarbons, particularly saturated hydrocarbons such as methane, ethane, propane, butane, and so forth, to produce either synthesis gas or more unsaturated hydrocarbons are examples of Specific processes in which the invention described herein is readily applicable.

It will also be obvious to those skilled in the art that the quenching medium used in the novel process of this invention is not limited to water. Any fluid, inert under the conditions of the reaction, can be used in the process in the manner specified herein.

What is claimed is:

1. In a chemical reaction wherein the reaction is carried out at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of at least two sets of cooling liquid quench sprays, each set of quench sprays being positioned on a separate plane which is perpendicular to the direction of flow of the reaction mixture through the quench zone and each set being comprised of individual liquid fan-shaped sprays symmetrically positioned around the periphery of the quench zone and directed to merge with the individual liquid sprays of the other sets of sprays in the central area of the quench zone where the reaction mixture enters into the quench zone.

2. In a chemical reaction wherein the reaction is carried out at an elevated temperature in the vapor phase in a reaction zone and the reaction mixture produced then quenched with a liquid quench medium in a quench zone to quick reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid fan-shaped sprays symmetrically positioned around the periphery of the quench zone and directed to merge with the individual liquid sprays of the other set of sprays in the central area of the quench zone where the reaction mixture enters into the quench zone.

3. In a chemical reaction wherein the reaction is carried out at an elevated temperature in the vapor phase with the production of a flame in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid fan-shaped sprays symmetrically positioned around the periphery of the quench zone and directed to merge with the individual liquid sprays of the other set of sprays in the central area of the quench zone where the reaction mixture enters into the quench zone.

4. In a process for the partial oxidation of hydrocarbons wherein a hydrocarbon and an oxygen-containing gas are reacted at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid fan-shaped sprays symmetrically positioned around the periphery of the quench zone and directed to merge with the individual liquid sprays of the other set of sprays in the central area of the quench zone where the reaction mixture enters into the quench zone.

5. In a process for the production of acetylene wherein methane and oxygen are reacted at an elevated temperature in the vapor phase in a reaction zone with the production of a flame and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid fan-shaped sprays symmetrically positioned around the periphery of the quench zone and directed to merge with the individual liquid sprays of the other set of sprays in the central area of the quench zone where the reaction mixture enters into the quench zone.

6. A process as described in claim 5 wherein the cooling liquid quench sprays are water.

7. In a chemical reaction wherein the reaction is carried out an an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of at least two sets of cooling liquid quench sprays, each set of quench sprays being positioned on a separate plane which is perpendicular to the direction of flow of the reaction mixture through the quench zone and each set being comprised of individual liquid hollow cone sprays symmetrically positioned around the periphery of the quench zone and directed to merge with the individual liquid sprays of the other sets of sprays in the central area of the quench zone where the reaction mixture enters into the quench zone.

8. In a chemical reaction wherein the reaction is carried out at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid hollow cone sprays symmetrically positioned around the periphery of the quench zone and directed to merge with the individual liquid sprays of the other set of sprays in the central area of the quench zone where the reaction mixture enters into the quench zone.

9. In a chemical reaction wherein the reaction is carried out at an elevated temperature in the vapor phase with the production of a flame in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid hollow cone sprays symmetrically positioned around the periphery of the quench zone and directed to merge with the individual liquid sprays of the other set of sprays in the central area of the quench zone where the reaction mixture enters into the quench zone.

10. In a process for the partial oxidation of hydrocarbons wherein a hydrocarbon and an oxygen-containing gas are reacted at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid hollow cone sprays symmetrically positioned around the periphery of the quench zone and directed to merge with the individual liquid sprays of the other set of sprays in the central area of the quench zone where the reaction mixture enters into the quench zone.

11. In a process for the production of acetylene wherein methane and oxygen are reacted at an elevated temperature in the vapor phase in a reaction zone with the production of a flame and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by passing the reaction mixture through a cooling liquid quench medium formed by the confluence of two sets of cooling liquid quench sprays, each set of quench sprays being positioned on a separate plane which is perpendicular to the direction of flow of the reaction mixture through the quench zone and each set being comprised of individual liquid hollow cone sprays symmetrically positioned around the periphery of the quench zone and directed to merge with the individual liquid sprays of the other set of sprays in the central area of the quench zone where the reaction mixture enters into the quench zone.

12. A process as described in claim 11 wherein the cooling liquid quench sprays are water.

References Cited in the file of this patent

UNITED STATES PATENTS

| | | |
|---|---|---|
| 2,679,542 | Dorsey | May 25, 1954 |
| 2,721,227 | Mungen | Oct. 18, 1955 |
| 2,731,466 | Heffner | Jan. 17, 1956 |
| 2,789,148 | Schutte | Apr. 16, 1957 |
| 2,816,942 | Bills | Dec. 17, 1957 |
| 2,822,411 | Braconier et al. | Feb. 4, 1958 |